March 24, 1925.
T. BRADY
1,530,927
METHOD OF ICE HARVESTING AND APPARATUS THEREFOR
Filed Jan. 27, 1923
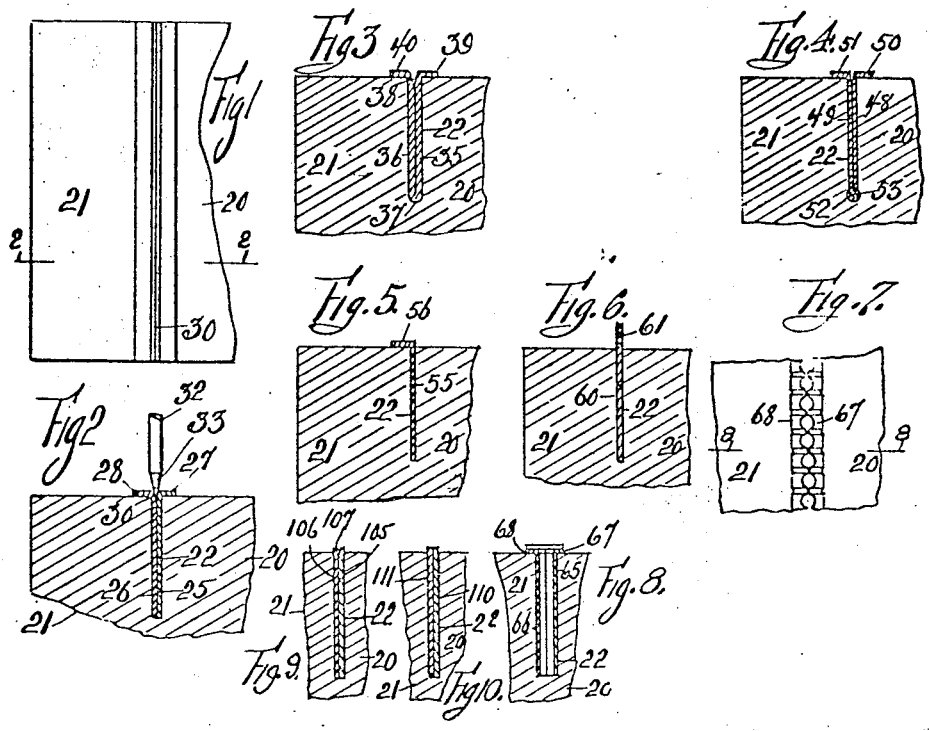

Patented Mar. 24, 1925.

1,530,927

UNITED STATES PATENT OFFICE.

THOMAS BRADY, OF BAYONNE, NEW JERSEY.

METHOD OF ICE HARVESTING AND APPARATUS THEREFOR.

Application filed January 27, 1923. Serial No. 615,364.

*To all whom it may concern:*

Be it known that I, THOMAS BRADY, a citizen of the United States, and resident of Bayonne, in the county of Hudson and State of New Jersey, have invented certain new and useful Improvements in a Method of Ice Harvesting and Apparatus Therefor, of which the following is a specification.

This invention relates to a method of ice harvesting and apparatus therefor.

The object of the invention comprises the method of ice harvesting and the apparatus, to separate strips and cakes of ice from larger portions thereof, whether natural or artificial. A second object of the invention is the insertion into cuts made in ice, of means which will prevent said cuts filling with water, which latter when frozen would obliterate the cuts.

A third object of the invention is to harvest cakes of ice in close proximity to each other to save space, and to be enabled to separate the cakes when required into practically the same size or dimensions as when harvested, and without breaking or marring any of the edges or corners thereof.

The organization of the invention is founded on the principle of locating in a cut made in the ice of a separate blade or a pair of separator blades of metal or the like, with a pair of their faces preferably bearing against each other. Said blades are preferably made of materials that are good conductors of heat and when placed in said cuts displace water therein that might freeze. A second feature of the organization of the invention, comprises means to separate a pair of said blades, when located in a cut made in ice and thereby providing means of forming cakes of ice from larger portions thereof.

Various equivalent appurtenances may be employed to carry out the steps of the new method. A number of such appurtenances are indicated in the accompanying drawings, and in Fig. 1 is shown a plan view of a large piece of ice in the open with a pair of separator blades inserted in a cut thereof; Fig. 2 shows a section of Fig. 1 on the line 2, 2; Figs. 3 to 6 indicate sections similar to Fig. 2 with modifications; Fig. 7 shows a plan view of a piece of ice with a pair of still further modified separator blades; Fig. 8 shows a section of Fig. 7 on the line 8, 8; Figs. 9 and 10 represent sections similar to Fig. 2 with other modifications.

Referring to Figs. 1 and 2 a large piece of ice in the open is indicated with the portions 20, 21 and the cut 22, made by any of the usual cutting devices. Metallic separators are inserted in the cut to completely close the same as indicated in the drawing and comprise the parallel separator blades 25 and 26 having the flanges 27 and 28 at their upper ends. The adjacent faces of the blades when inserted in the cut 22 bear against each other. The upper ends of the blades 25 and 26 recede from each other to form a longitudinal tapered opening 30. A bar 32 with a tapered end 33 may be inserted in the opening 30. The separator blades prevent the cut 22 becoming filled with water and prevent the freezing of the portions 20 and 21 of the ice to each other. When the tapered end 33 of the bar 32 is inserted in the opening 30, the blades 25 and 26 can be separated, and thereby the portion 31 is separated from the portion 20, and can be moved away for further operation. The flanges 27 and 28 prevent the upper edges and corners of the portions 20 and 21 of ice becoming marred or broken when they are separated.

In Fig. 3, the portions 20 and 21 of ice are shown with the cut 22 and separator blades 35 and 36 joined at their lower end 37, and the tapered opening 38 at their upper ends. Flanges 39 and 40 extend from the upper ends of the blades 35 and 36.

The steps of the method shown in Fig. 3 are similar to that described for Figs. 1 and 2.

In Fig. 4 the portions 20 and 21 of the cake of ice are again indicated with the cut 22 and a pair of separator blades 48, 49 are indicated having the flanges 50 and 51 at their upper ends and a bulged shaped lower end 52 with a coil 53 therein for electric current. In this modification the heat imparted to the coil 53 is in addition to that of the surrounding atmosphere and assist in separating the portions 20 and 21 of the cakes of ice, when the members 48 and 49 are pried open.

In Fig. 5 the cut 22 of the portions 20 and 21 of the ice has inserted therein the single separator blade 55 having the flange 56 at its upper end. With this device the blade 55 is raised by prying under the flange 56 when the portions of the cake can be easily separated.

In Fig. 6 the cut 22 of the portions 20 and 21 of the ice has located therein the single separator blade 60 with the openings 61 in its upper portion. With this device, bars are inserted in a number of the openings 61 to raise the blade 60 out of the cut 22, when the portions 20 and 21 can be easily separated from each other.

In Figs. 7 and 8 the cut 22 of the portions 20 and 21 of the ice has located therein a pair of corrugated separator blades 65 and 66 having the flanges 67 and 68 at their upper ends. A bar can be easily inserted in the corrugations to separate the blades and thereby the portions 20 and 21 of the piece of ice.

In Fig. 9 the portions of ice 20 and 21 are indicated with the cut 22. Straight metallic separator blades 105 and 106 are indicated in the cut 22 with the faces bearing against each other and with the opening 107 at their upper ends.

In Fig. 10 a pair of straight separator blades 110, 111 with their adjacent faces bearing against each other are shown in the cut 22 of the portions of ice 20 and 21. The blades 25, 26 and their flanges 27 and 28 and all the other blades described are preferably made of iron or steel and are also preferably zinc coated or galvanized. The blades are good conductors of heat and the heat of the surrounding atmosphere is conducted through them to the portions or cakes of ice.

Various modifications may be made in the invention and the present exemplification is to be taken as illustrative and not limitative thereof.

Having described my invention what I desire to secure by Letters Patent and claim is:

1. The method of separating a portion of ice into cakes, consisting in cutting a groove in the ice, maintaining the grooves clear of ice by completely filling them with non- freezable elements and prying into the groove to form cakes from the portion of ice substantially as described.

2. The method of separating a portion of ice into cakes, consisting in cutting a groove in the ice, maintaining the groove clear of ice by completely filling it with a non-freezable element, conducting the heat of the surrounding atmosphere into the groove and prying open the groove to separate the ice into portions substantially as described.

3. The method of separating a portion of ice into cakes, consisting in forming a groove in the ice, maintaining the groove clear of ice by completely filling it with a non-freezable element, conducting artificial heat into said groove and prying open said groove to separate the ice into cakes, substantially as described.

4. The method of forming cakes of ice from a large portion thereof, consisting in forming a plurality of grooves in the ice, maintaining the grooves clear of water by completely filling them with a non-freezable element and prying open said grooves to form cakes of ice substantially as described.

5. In an apparatus of the character described the combination of a pair of separator blades joined at their lower ends and having a tapered opening formed between them at their upper ends.

6. In an apparatus of the character described the combination of a pair of separator blades joined at their lower ends and having a tapered opening formed between them at their upper ends and a source of heat at their lower ends.

Signed at Bayonne, in the county of Hudson and State of New Jersey, this 9th day of January A. D. 1923.

THOMAS BRADY.